United States Patent
Stieff

(10) Patent No.: US 9,170,101 B2
(45) Date of Patent: Oct. 27, 2015

(54) METHOD AND APPARATUS FOR POSITIONING A VEHICLE SERVICE DEVICE RELATIVE TO A VEHICLE THRUST LINE

(71) Applicant: Hunter Engineering Company, Bridgeton, MO (US)

(72) Inventor: Michael T. Stieff, Wentzville, MO (US)

(73) Assignee: Hunter Engineering Company, St. Louis, MO (US)

( * ) Notice: Subject to any disclaimer, the term of this patent is extended or adjusted under 35 U.S.C. 154(b) by 180 days.

(21) Appl. No.: 13/659,566

(22) Filed: Oct. 24, 2012

(65) Prior Publication Data

US 2013/0110314 A1    May 2, 2013

Related U.S. Application Data

(60) Provisional application No. 61/552,760, filed on Oct. 28, 2011.

(51) Int. Cl.
*G01C 9/00* (2006.01)
*G01B 11/27* (2006.01)
*G01B 11/275* (2006.01)

(52) U.S. Cl.
CPC .............. *G01B 11/275* (2013.01); *G01B 11/27* (2013.01); *G01B 2210/16* (2013.01)

(58) Field of Classification Search
CPC ........... G06F 17/00; B60W 2050/0008; B60C 23/04; G01L 7/045; G01B 11/27; G01B 11/275; G01B 2210/16
See application file for complete search history.

(56) References Cited

U.S. PATENT DOCUMENTS

| | | | | |
|---|---|---|---|---|
| 4,338,027 A | * | 7/1982 | Eck | 356/155 |
| 4,615,618 A | * | 10/1986 | Bailey et al. | 33/203.18 |
| 4,918,821 A | * | 4/1990 | Bjork | 356/155 |
| 5,048,954 A | * | 9/1991 | Madey et al. | 356/155 |
| 5,157,838 A | * | 10/1992 | Sims | 33/203.18 |
| 5,274,433 A | * | 12/1993 | Madey et al. | 356/155 |
| 5,760,938 A | * | 6/1998 | Hodge | 359/641 |
| 6,020,844 A | | 2/2000 | Bai et al. | |

(Continued)

FOREIGN PATENT DOCUMENTS

| | | |
|---|---|---|
| DE | 19857871 C1 | 10/2000 |
| DE | 10114799 A1 | 10/2002 |

(Continued)

*Primary Examiner* — James Trammell
*Assistant Examiner* — Demetra Smith-Stewart
(74) *Attorney, Agent, or Firm* — Polster, Lieder, Woodruff & Lucchesi, L.C.

(57) ABSTRACT

A method and apparatus for utilizing a vehicle wheel alignment system to guide the placement and orientation of a vehicle service apparatus or alignment fixture relative to the thrust line of a vehicle. A laser adapter for projecting a reference line is mounted to a steerable wheel of the vehicle, and is aligned relative to both a line of the vehicle and to the supporting surface on which the vehicle is disposed. The vehicle line is determined by the vehicle wheel alignment system, and the steerable wheel, together with the adapter, are steered relative to the determined vehicle line, such that a projected reference line defined by the position and orientation of the adapter is established parallel to both the supporting surface and the vehicle line. The placement and orientation of the vehicle service apparatus or alignment fixture is subsequently adjusted relative to the projected reference line.

18 Claims, 8 Drawing Sheets

(56) References Cited

U.S. PATENT DOCUMENTS

| | | | |
|---|---|---|---|
| 6,134,792 A * | 10/2000 | January | 33/203.18 |
| 6,327,785 B1 * | 12/2001 | Dale et al. | 33/288 |
| 6,329,952 B1 * | 12/2001 | Grace | 343/703 |
| 6,363,619 B1 | 4/2002 | Schirmer et al. | |
| 6,370,455 B1 * | 4/2002 | Larson et al. | 701/31.4 |
| 6,583,868 B2 | 6/2003 | Hopfenmuller | |
| 6,636,172 B1 | 10/2003 | Prestl et al. | |
| 6,754,562 B2 | 6/2004 | Strege et al. | |
| 6,813,015 B2 * | 11/2004 | Knoedler et al. | 356/155 |
| 6,917,417 B2 | 7/2005 | Strege et al. | |
| 7,007,395 B2 * | 3/2006 | Douglas | 33/288 |
| 7,121,011 B2 | 10/2006 | Murray | |
| 7,346,994 B2 | 3/2008 | Shevela | |
| 7,359,775 B2 | 4/2008 | Strege et al. | |
| 7,382,913 B2 | 6/2008 | Dorrance et al. | |
| 7,424,387 B1 * | 9/2008 | Gill et al. | 702/150 |
| 7,518,714 B2 * | 4/2009 | Voeller et al. | 356/155 |
| 7,532,742 B2 * | 5/2009 | Healy | 382/103 |
| 7,703,212 B2 * | 4/2010 | Stieff et al. | 33/203.18 |
| 7,810,244 B2 * | 10/2010 | Stieff et al. | 33/203.18 |
| 7,853,374 B2 * | 12/2010 | Ko | 701/408 |
| 8,033,028 B2 * | 10/2011 | Stieff et al. | 33/203.18 |
| 8,215,023 B2 * | 7/2012 | Stieff et al. | 33/203.18 |
| 8,244,024 B2 * | 8/2012 | Dorrance et al. | 382/151 |
| 8,341,848 B2 * | 1/2013 | Stieff et al. | 33/203.18 |
| 8,490,290 B2 * | 7/2013 | Stieff et al. | 33/203.18 |
| 2005/0138823 A1 * | 6/2005 | Douglas | 33/203.18 |
| 2009/0059213 A1 * | 3/2009 | Wesby | 356/139.09 |
| 2014/0022115 A1 * | 1/2014 | Borruso | 342/167 |

FOREIGN PATENT DOCUMENTS

| | | |
|---|---|---|
| EP | 1260832 A1 | 11/2002 |
| EP | 0984297 B1 | 3/2003 |
| EP | 0905526 B1 | 12/2003 |
| WO | 2004102114 A1 | 11/2004 |

* cited by examiner

METHOD AND APPARATUS FOR POSITIONING A VEHICLE SERVICE DEVICE RELATIVE TO A VEHICLE THRUST LINE

CROSS-REFERENCE TO RELATED APPLICATIONS

The present application is related to, and claims priority from, U.S. Provisional Patent Application Ser. No. 61/552,760 filed on Oct. 28, 2011, which is herein incorporated by reference.

STATEMENT REGARDING FEDERALLY SPONSORED RESEARCH

Not Applicable.

BACKGROUND OF THE INVENTION

The present invention relates to the alignment of vehicle components relative to one or more features of a vehicle, and in particular, to methods and apparatus for utilizing a vehicle wheel alignment system to facilitate adjusting the alignment of sensors associated with forward looking vehicle collision avoidance systems relative to a determined thrust line of the vehicle.

Machine vision vehicle wheel alignment systems have been in use by the vehicle service industry for several years. A typical machine vision vehicle wheel alignment system, such as the Series WA400 wheel alignment system, configured with the Hawkeye Alignment sensors manufactured by Hunter Engineering Co. of Bridgeton, Mo. consists of a console unit, imaging sensors or cameras, and optical targets. The console unit contains a computer or processor configured with suitable image processing and vehicle wheel alignment software applications, and incorporates various conventional operator interfaces, such as a keyboard, a mouse, a printer, and a display device. The imaging sensors or cameras are operatively coupled to the computer or processor, and the optical targets are disposed in the field of view of the imaging sensors or cameras, typically mounted to the wheels of a vehicle undergoing an alignment inspection.

Commonly, to view the left and right sides of a vehicle, at least one imaging sensor or camera is disposed with a field of view oriented to observe the left side of the vehicle, and at least one imaging sensor or camera is disposed with a field of view orientation to observe the right side of the vehicle. The field of view of each imaging sensor or camera encompasses one or more wheels of the vehicle. In alternative configurations, two imaging sensors or cameras are provided on each side of the vehicle, each having a field of view encompassing at least one of the two vehicle wheels on the respective side of the vehicle, i.e. a left front, left rear, right front, and right rear wheel, respectively. To facilitate vehicle wheel alignment, optical targets are mounted on the vehicle wheels, and observed by the imaging sensors or cameras. The optical targets preferably have predetermined features which are identified in images obtained by the imaging sensors or cameras, and which facilitate a determination of the position and orientation of the optical targets in three dimensional space. The image processing may either take place in the imaging sensor or camera modules, or in the console computer or processor. Once the position and orientation of each optical target is determined, the position and orientation of the associated vehicle wheel can be determined, and corresponding, the various vehicle wheel alignment angle measurements may be either determined or calculated by the computer or processor using suitable mathematical algorithms. Vehicle wheel alignment angle measurements typically include a measure of camber, caster, and toe angles for each vehicle wheel, as well as the spatial position and orientation of the vehicle centerline and the vehicle rear thrust line.

It is becoming increasingly common for automotive vehicles to be equipped with various external sensor systems, such parking assist cameras, backup cameras, lane departure warning systems, blind spot detections systems, adaptive cruise control systems, and forward-looking collision avoidance radar components. Many of these external sensor systems require precise positioning and/or alignment of an associated field of view for proper operation. For example, adaptive cruise control system and collision avoidance radar components typically operate in either a frequency modulation (FM) or continuous wave (CW) mode to transmit a forward-looking signal from an antenna typically located in the front grill area of an automobile. The collision avoidance radar then determines from the return signal received by the antenna a distance an object causing the return signal is located from the automobile and the rate of closure of the object. Adaptive cruise control systems in the United States of America are currently configured to operate within a 76-77 GHz frequency band allocated by the Federal Communications Commission (FCC) for collision avoidance radar systems. However, other collision avoidance systems may be constructed which operate within different portions of the electromagnetic spectrum, for example, utilizing infrared or visible light lasers to obtain information about objects in the path of a vehicle, or alternatively, utilizing ultrasonic signals or cameras.

To obtain an accurate measure of the distance between the vehicle on which the collision avoidance components are mounted, and an observed object in the path of the vehicle, it is necessary to ensure that the object is in fact observed along the same vector as the vehicle is traveling, which is typically the vehicle rear thrust line for straight-line motion. In other words, it is necessary to ensure that signals emitted by a collision avoidance system, or field of view of an associated camera, are aligned along the same vector as the vehicle is traveling. Any misalignment between the transmission/observation vector and the direction of vehicle travel may result in misidentification of approaching objects, a miscalculation of the distances between the vehicle and the object, and accordingly, a miscalculation of the rate of closure between the two. Depending upon the severity of the miscalculation, the collision avoidance system might fail to recognize an impending collision, or in the case of adaptive cruise control systems, might signal a reduction in vehicle speed which is less than that which is actually required to safely avoid a collision between the vehicle and the approaching object.

Conventionally, the manufacturer of the vehicle external sensor system, such as a collision avoidance system, provides a vehicle service apparatus or alignment fixture specifically designed to facilitate the alignment of the signal emitting and receiving components. For example, a collision avoidance system alignment fixture is placed in front of the vehicle, and configured with components to facilitate a precise placement and orientation of the alignment fixture relative to the vehicle as specified by the vehicle manufacturer. These may include alignment marks onto which lasers are projected from laser pointers mounted to fixed positions on the vehicle structure (or in converse, may include mounting points for lasers to project towards alignment marks on the vehicle). Alternatively, the collision avoidance system alignment fixture may include mounting points to receive traditional transducer-based vehicle wheel alignment sensor heads or machine vision optical targets which are then observed by a suitably configured vehicle wheel alignment system to guide the operator to properly place and orient the fixture. Once the fixture is properly placed and oriented as specified by the vehicle manufacturer, the operator proceeds with a calibration procedure for the collision avoidance system (or other external sensing system) as specified by the vehicle manufacturer. These procedures typically requires that the vehicle sensor system be activated on-board the vehicle by the operator to observe the alignment fixture and to provide appropriate feedback for adjustment and calibration. Alternatively, a laser may be projected from the alignment fixture towards a target or mirror associated with the vehicle sensor system, and adjustments made to the vehicle sensor system to reflect the laser back to a specified point on the alignment fixture. In some cases, an OEM vehicle-specific scan tool or external control unit is required to be coupled to the vehicle ECU by the operator in order to initiation and or complete the adjust and calibration procedures.

U.S. Pat. No. 7,382,913 B2 to Dorrance et al., herein incorporated by reference, describes a method for facilitating the placement of a vehicle collision avoidance system alignment fixture relative to the direction of travel of an associated vehicle, using a machine vision vehicle wheel alignment system, cameras, and associated optical targets, thereby eliminating the need for vehicle service centers to either delay acquiring machine vision vehicle wheel alignment systems or maintaining both a machine vision vehicle wheel alignment system for vehicle wheel alignment measurements and a conventional transducer-based vehicle wheel alignment system specifically for the purposes of aligning vehicle collision avoidance system fixtures.

In order to utilize the machine vision vehicle wheel alignment system features, the '913 Dorrance et al. method requires the placement of an additional set of optical cameras on the vehicle collision avoidance system alignment fixture, to enable the machine vision vehicle wheel alignment system to observe wheel mounted optical targets from the position of the fixture, and to direct to operator to carry out any necessary placement adjustments for the fixture prior to adjusting the alignment of a collision avoidance system components on the vehicle.

Accordingly, it would be advantageous to provide a low cost method and simplified apparatus to facilitate the placement of a vehicle service apparatus, such as a headlight aiming device, or alignment fixtures for vehicle external sensor systems such as Intelligent Vehicle Highway Systems, relative to the thrust line of a vehicle undergoing a vehicle service procedure, without directly using components of a vehicle wheel alignment system mounted to the vehicle service apparatus or alignment fixture, thereby eliminating the need for additional or supplemental machine vision cameras, image processing procedures, optical targets, or conventional alignment angle transducers to complete the vehicle service procedure.

It would be advantageous to provide a low cost method and simplified apparatus to facilitate the placement of a of a vehicle service apparatus, such as a headlight aiming device, or alignment fixtures for vehicle external sensor systems such as Intelligent Vehicle Highway Systems, relative to the surface on which the vehicle undergoing a vehicle service procedure is currently resting, without directly using components of a vehicle wheel alignment system mounted to the vehicle service apparatus or alignment fixture, thereby eliminating the need for additional or supplemental machine vision cameras, image processing procedures, optical targets, or conventional alignment angle transducers to complete the vehicle service procedure, as well as compensating for any variations in the levelness of the surface on which the vehicle is disposed.

It would be further advantageous to provide a vehicle service system, such as a vehicle wheel alignment system, with the capability to communicate with an on-board computer or control system (ECU) of a vehicle, in order to either initiate or carry out, an OEM calibration or alignment procedure associated with an external sensor system of the vehicle once a vehicle service apparatus or alignment fixture has been properly positioned and oriented in proximity to the vehicle, thereby reducing the steps an operator must carry out to complete the procedure and eliminating the need for additional scan tools or interface devices.

BRIEF SUMMARY OF THE INVENTION

Briefly stated, the present disclosure provides a vehicle service apparatus alignment system which is configured to operate in conjunction with a machine vision vehicle wheel alignment system employing wheel mounted optical targets to facilitate the orientation and placement of a vehicle service apparatus relative to a an associated vehicle for use in aligning an external sensor system of the vehicle. The vehicle service apparatus alignment system includes a laser-based alignment device which is co-axially mounted between an optical target of the machine vision vehicle wheel alignment system and a vehicle wheel to establish an observable reference line. The vehicle wheel alignment system is configured to utilize data from images of the optical targets acquired by various imaging sensors or cameras to guide necessary adjustments to the alignment of the wheels of the motor vehicle. With the wheels of the motor vehicle in proper alignment, the projected reference line is utilized to guide the orientation and placement of the vehicle service apparatus relative to the vehicle.

In a further embodiment of the present disclosure, the machine vision vehicle wheel alignment system is configured to communicate with a vehicle on-board ECU or controller to initiate or carry out a vehicle-specific procedures required to calibrate or align the vehicle external sensors relative to a vehicle service apparatus or alignment fixture which has been disposed in a required position and/or orientation in proximity to the vehicle.

In a further embodiment, the present disclosure sets forth a method for utilizing a vehicle service apparatus alignment system with a machine vision vehicle wheel alignment system having a set of optical targets mounted to the wheels of a vehicle via mounting adapters. One of the front optical targets is initially removed from an associated wheel mounting adapter, and a laser-based alignment device is installed in the wheel mounting adapter. The front optical target is subsequently reinstalled on the vehicle wheel via a coaxially aligned target fixture on the laser based alignment device. Once installed, a laser is projected rearward from the laser-based alignment device towards an axial centerline of a rear wheel optical target mounting shaft, and is aligned to be parallel to a support surface on which the vehicle is disposed. Once the laser-based alignment device is aligned parallel to the support surface, the front vehicle wheel on which the laser-based alignment device is mounted is steered into parallel alignment with the vehicle thrust line, as determined by the machine vision vehicle wheel alignment system through observation of the associated optical targets. With the front wheel aligned relative to the vehicle thrust line, a second laser beam is projected from the laser based alignment device in the forward direction, towards a mirror reflective target associated with a vehicle service apparatus or alignment fixture positioned generally in front of the vehicle, or alternatively, from a laser emitter on the vehicle service apparatus or alignment fixture towards a mirror reflective target on the laser-based alignment device mounted to the front wheel. The position and orientation of the vehicle service apparatus or alignment fixture is then adjusted and oriented as required in order to retro-reflect the second laser back to the source from the mirror reflective target, thereby positioning the vehicle service apparatus or alignment fixture perpendicular to the determined vehicle thrust line when the reflected beam is aligned with the incident beam.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings. It is to be understood that the drawings are for illustrating the concepts set forth in the present disclosure and are not to scale.

Figure 1:
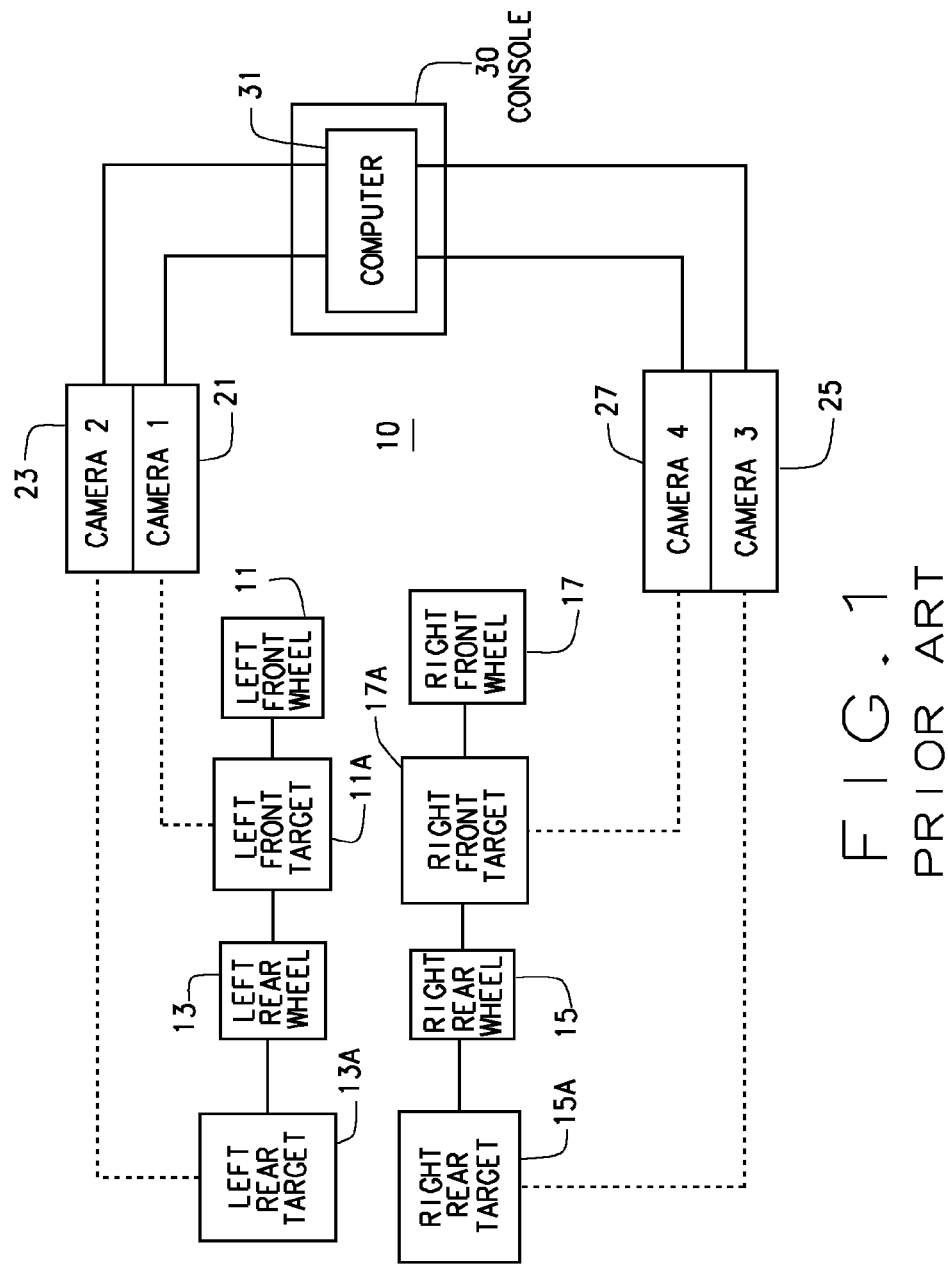
FIG. 1 is a block diagram of a prior art optical vehicle wheel alignment system.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

Turning to FIG. 1, the basic components of a conventional machine vision vehicle wheel alignment system are shown generally at 10. The system 10 is configured to determine the position and orientation of vehicle wheels 11, 13, 15, and 17, and the axis about which they roll. Each vehicle wheel has associated therewith one or more optical targets 11A, 13A, 15A, and 17A. Optionally, additional optical targets may be associated other components of the vehicle, with a lift rack, or other support structure on which the vehicle wheels rest. The images of the optical targets are obtained by imaging sensors or cameras 21, 23, 25, and 27, with each wheel within the field of view of at least one camera. Those of ordinary skill in the art will recognize that the number of imaging sensors or cameras used to observe the optical targets and acquire images thereof may be varied, provided that a sufficient number images of each optical target are obtained and processed by the machine vision vehicle wheel alignment system as required to determine all necessary vehicle measurements.

Data from the imaging sensors or cameras is supplied to a wheel alignment system console 30, and in particular, to a processor or computer 31 disposed within the console. The processor or computer is configured with suitable software instructions to utilize the supplied data to determine various wheel alignment angles, vehicle measurements, and lines of the vehicle such as a vehicle rear thrust line or a vehicle centerline, utilizing known machine vision methods and procedures to establish coordinate reference systems, identify positions and orientations within those systems, transform data between established coordinate reference systems.

The method and apparatus of the present disclosure for aligning a vehicle service apparatus or alignment fixture, relative to a vehicle are intended for use with a machine vision vehicle wheel alignment system such as shown generally at 10, and will be described herein in that context. However, those of ordinary skill in the art will recognize that the present disclosure is not limited to use with machine vision vehicle wheel alignment systems, and may be utilized with other types of vehicle wheel alignment systems, including conventional systems which utilize wheel-mounted alignment angle transducers secured to the vehicle wheels by means of a mounting shaft fitted to a receiver in a wheel mounted adapter normally utilized to receive a mounting shaft associated with an optical target or angle transducer.

Figure 2:
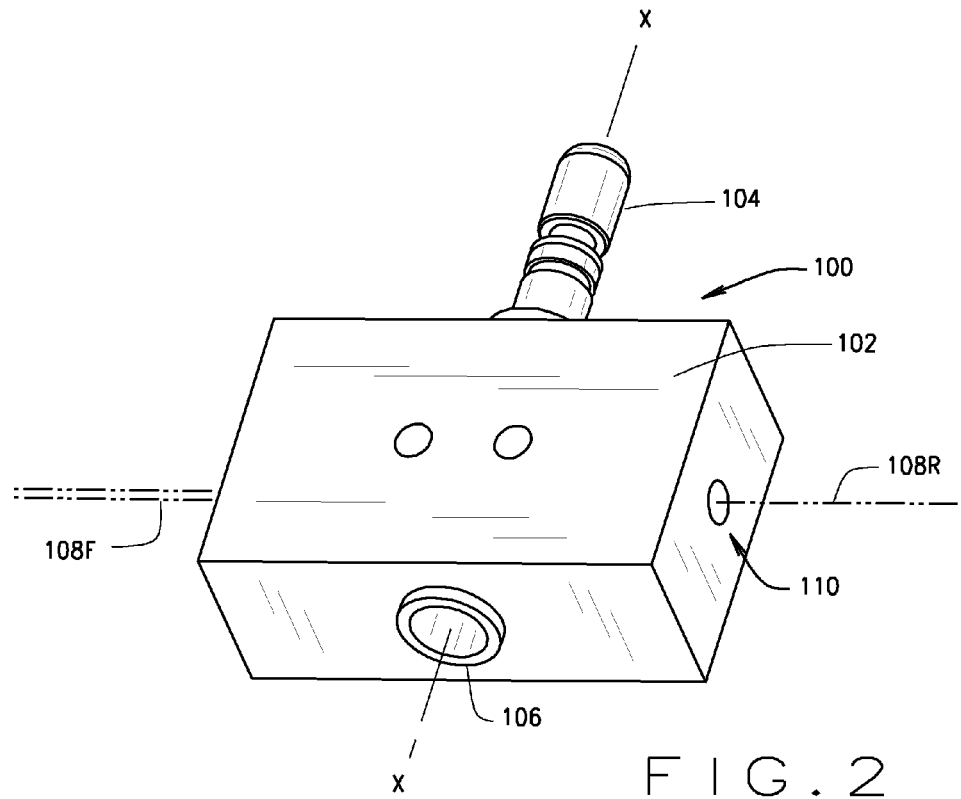
FIG. 2 is a perspective view of double sided laser alignment device of the present disclosure.
Figure 3:
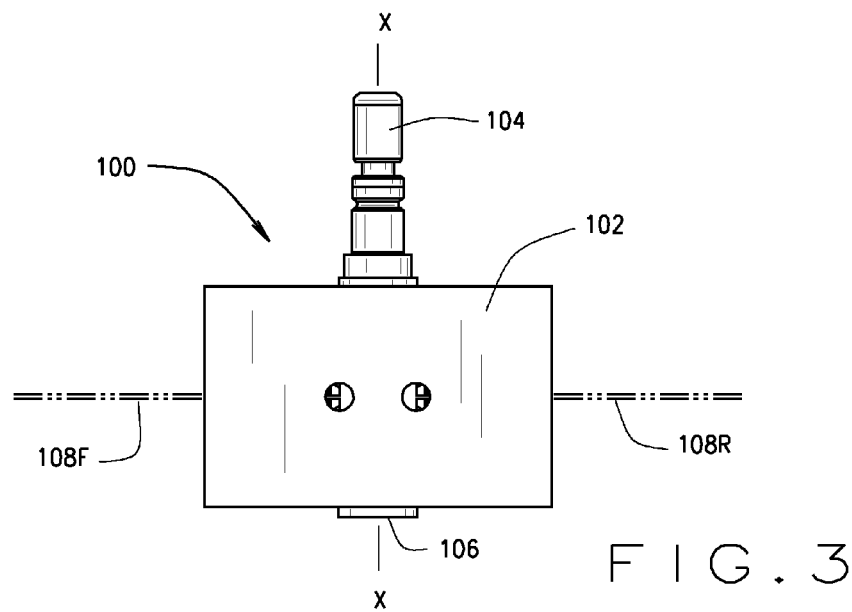
FIG. 3 is a top plan view of the double sided laser alignment device of FIG. 2.

The vehicle service apparatus alignment system of the present disclosure functions to establish a reference line 108 which, in one embodiment, is parallel to both a thrust line TL of the vehicle 90 and to the surface G on which the vehicle is disposed. It will be readily recognized that while the present disclosure describes establishing the reference line 108 in relationship to the vehicle thrust line TL, the reference line 108 may be established relative to other lines or measurements of the vehicle, such as a vehicle centerline, without departing from the scope of the disclosure. In one embodiment, the system consists of two primary components and an optional laser alignment target. The first primary component is a laser assembly 100 as shown in FIGS. 2 and 3. The laser assembly consists of a compact housing 102 having a mounting shaft 104 projecting from an inboard surface, and a coaxially aligned mounting shaft 106 receiver disposed in an outboard surface. The mounting shaft and mounting shaft receiver are in axial alignment, such that the laser assembly may be coaxially interposed between a mounting shaft of an alignment target or transducer and a mounting shaft receiver on a vehicle wheel adapter.

Within the compact housing 102, a pair of laser projectors (or a single laser projector and associated beam-splitting optics) are arranged to emit reference laser beams 108f and 108r from associated apertures 110 on the vehicle-forward and vehicle-rearward faces of the housing. The forward and rearward projected laser beams are coaxially aligned, and are perpendicular to the axis X of the mounting shaft 104 and mounting shaft receiver 106, and provide a visual representation of the reference line 108.

Figure 4:
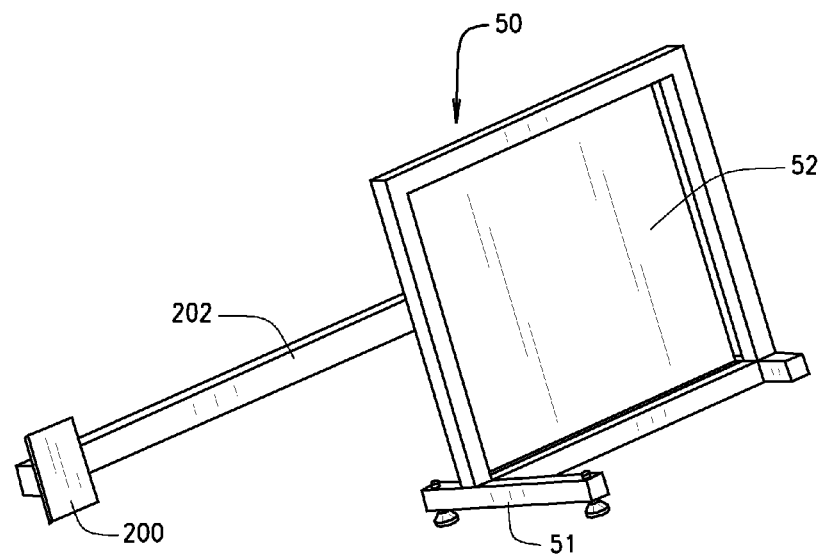
FIG. 4 is a front perspective view of a vehicle service system alignment target with a reflective panel.
Figure 5:
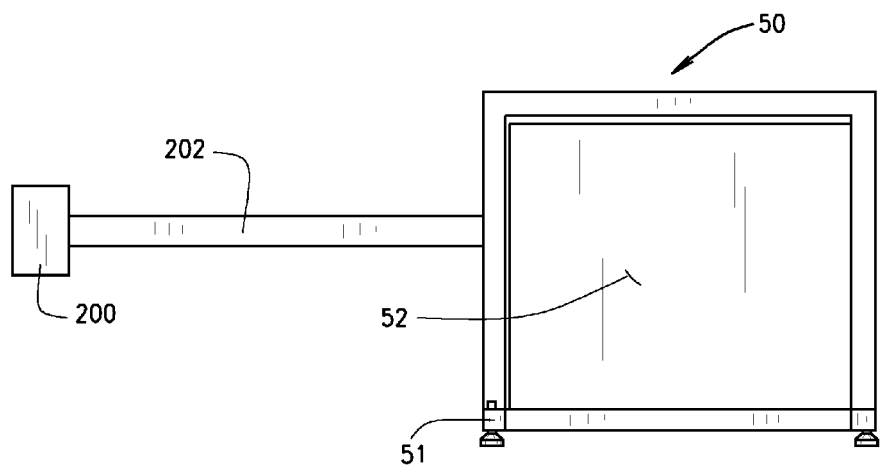
FIG. 5 is a front view of the vehicle service system alignment target of FIG. 4.
Figure 6:
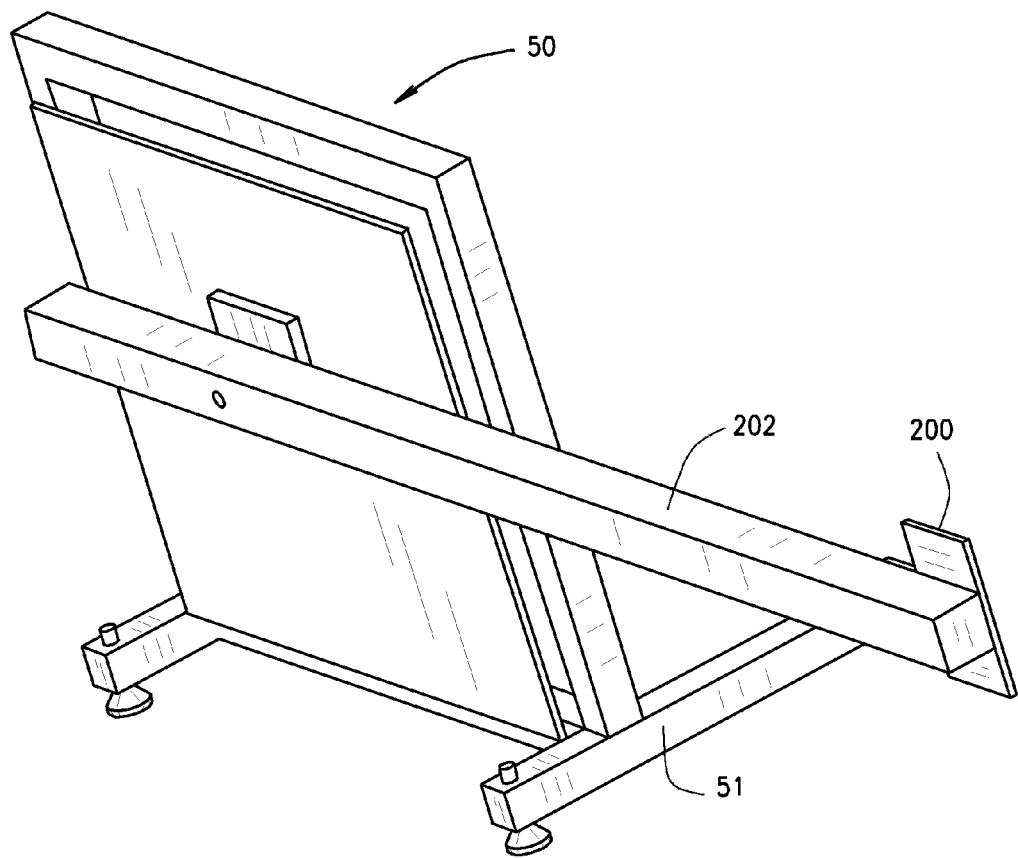
FIG. 6 is a rear perspective view of the vehicle service system alignment target of FIG. 4.

The second primary component consists of a mirror reflective target panel 200 secured via a mounting bracket 202 to the vehicle service apparatus or alignment fixture 50 supported on a base 51 in proximity to the vehicle, as best seen in FIGS. 4-6. The vehicle service apparatus or alignment fixture 50 may be any target structure used to facilitate alignment of an on-board vehicle system, such as a vehicle external sensor associated with a vehicle collision avoidance system or forward looking radar, or headlight projection system. The mounting bracket 202 positions the mirror reflective target panel 200 laterally outboard from the vehicle service apparatus or alignment fixture, and aligns the target panel 200 to be parallel with a front surface 52 of the vehicle service apparatus or alignment fixture 50. Preferably, the front surface 52 is a target surface, but may be any surface which is required to be disposed at a set position and/or orientation relative to a vehicle during a vehicle service procedure.

Those of ordinary skill in the art will recognize that a variety of different laser emitter and reflector configurations may be utilized with the present disclosure to establish alignment between a vehicle service apparatus or alignment fixture and a vehicle wheel without departing from the scope of the invention. For example, the laser assembly 100 may be replaced by a laser assembly having only a single laser projector arranged to emit a laser beam from an aperture 110 in the housing. The single laser projector may by secured within the housing 102 in a rotating mounting, or with selective optics, for selectively projecting laser beams 108f and 108r, as required during the vehicle service apparatus or alignment fixture relative alignment procedure. Alternatively, a single laser projector within the housing 102 may be configured to emit only laser beam 108r from the vehicle-rearward face of the housing 102. A mirror reflective target disposed on the vehicle-forward face of the housing 102 aligned with, and normal to, the projection axis of the rearward laser beam 108r, replaces laser beam 108f, while the reflective target panel 200 secured to the mounting bracket 202 of the vehicle service apparatus or alignment fixture 50 is replaced by a second laser emitter. The laser emitter on secured to the mounting bracket 202 is disposed to project a laser beam perpendicular to the vehicle service apparatus or alignment fixture surface 502, rearward towards the mirror reflective target on the single-sided laser assembly, function in substantially the same manner as laser beam 108f previously described.

Figure 7:
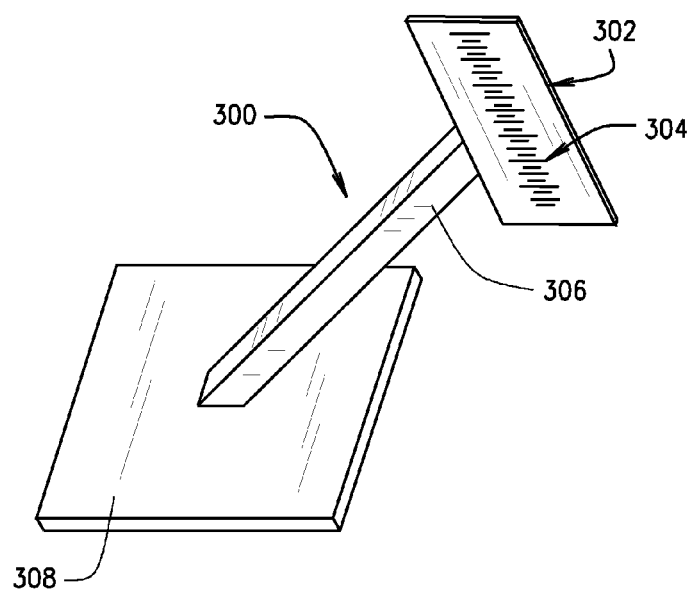
FIG. 7 is a perspective view of an optional laser alignment target for surface mounting.
Figure 8:
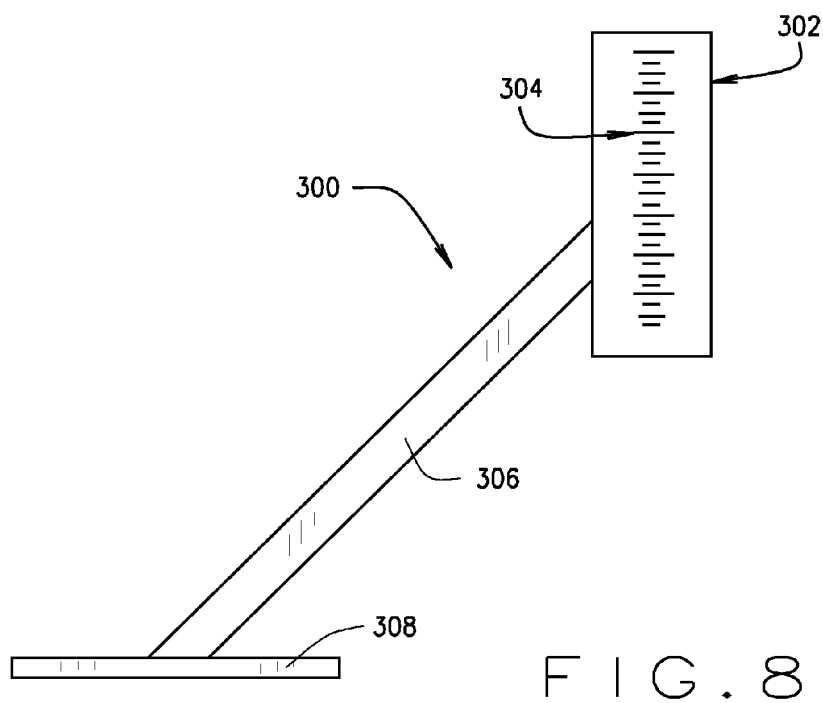
FIG. 8 is a front view of the optional laser alignment target of FIG. 7.

The third component of the system consists of a free-standing laser alignment target 300, shown in FIGS. 7 and 8. The laser alignment target 300 includes a target panel 302, having a plurality of visible alignment marks 304, mounted on a support arm 306 which extends upward and outward from a target base panel 308. The target base panel 308 is configured for stable placement on a supporting surface G, as seen in FIGS. 10 and 11, such as the ground or a vehicle lift, and the support arm 306 is oriented to position the target panel 302 at approximately the same height as a rotational axis of the vehicle wheels, but laterally offset away from a vehicle body, allowing the target base panel to be placed on or near the rolling pathway for the vehicle.

Figure 9:
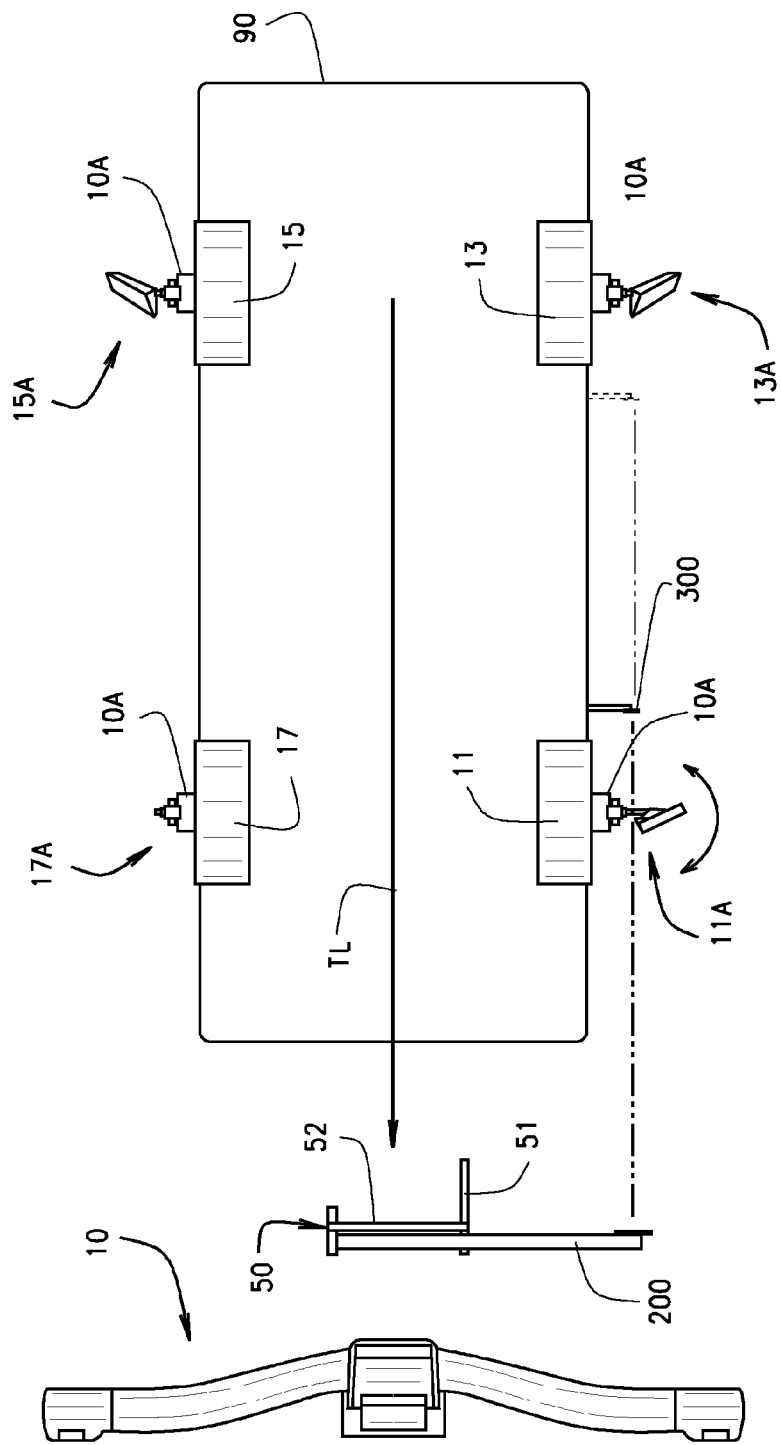
FIG. 9 is a top plan view of a motor vehicle, a machine vision vehicle wheel alignment system, and the vehicle service system alignment target positioned relative to the vehicle thrust line in accordance with the laser-based alignment procedure of the present disclosure.
Figure 10:
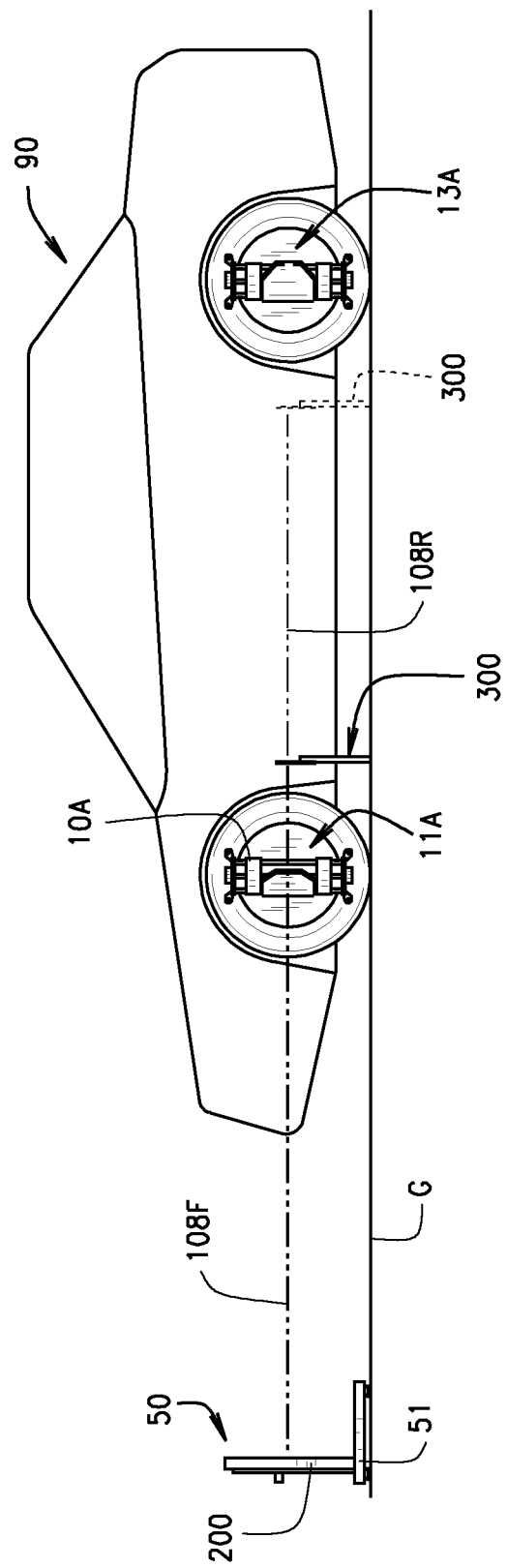
FIG. 10 is a side view of the motor vehicle of FIG. 9, illustrating the positioning of the various components relative to the projected lasers, as well as first and second placement positions for the optional laser alignment target.
Figure 11:
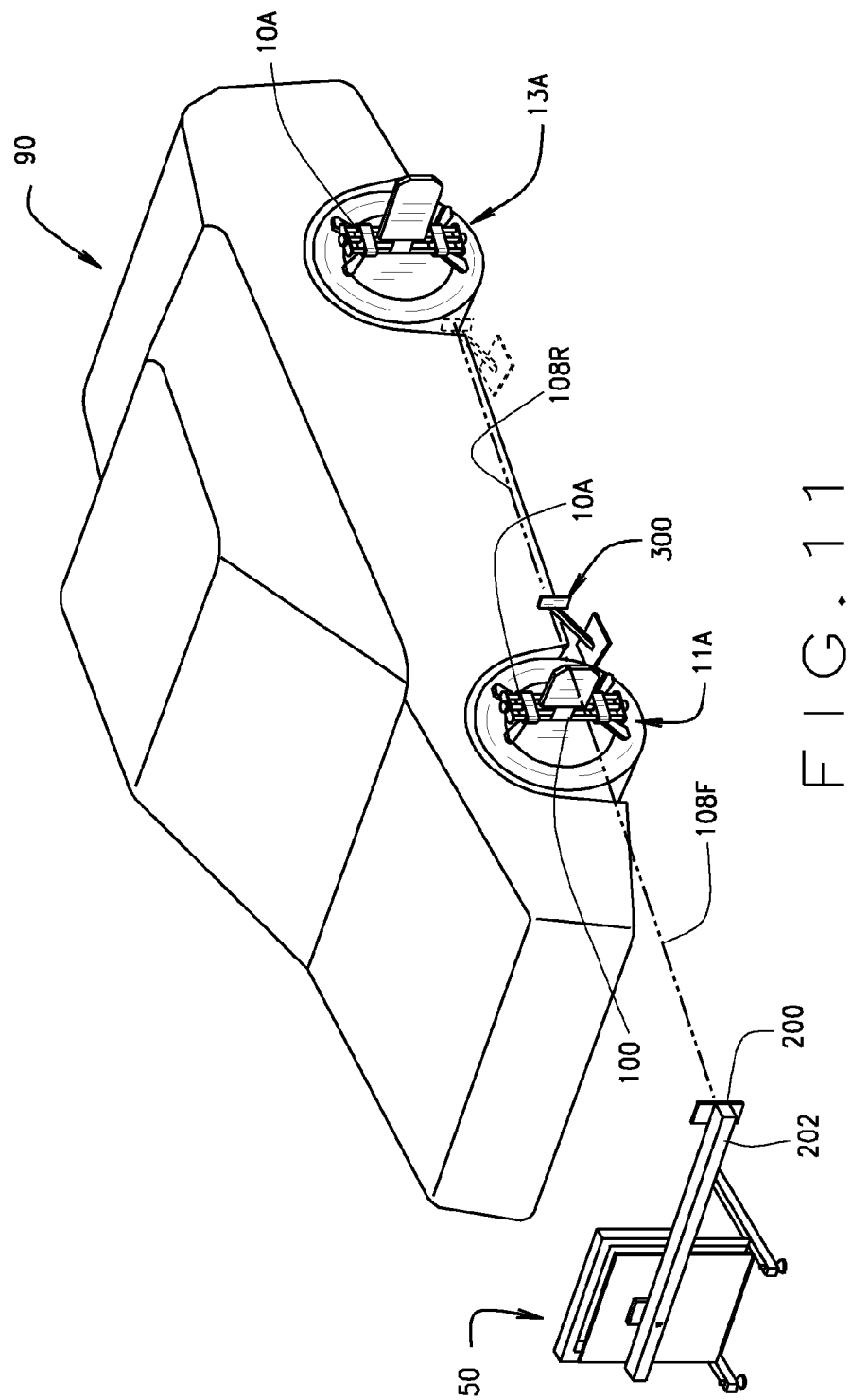
FIG. 11 is a perspective view corresponding to FIG. 10.

With reference to FIGS. 9-11, the components 100, 200, and 300 may be utilized in conjunction with a vehicle wheel alignment system 10 to provide a procedure for aligning the vehicle service apparatus or alignment fixture 50 relative to a vehicle 90, and in particular, relative to a determined thrust line of the vehicle. Initially, the vehicle 90 is positioned in a service bay and prepared for a conventional vehicle wheel alignment angle measurement and adjustment procedure. Wheel adapters 10a are secured to each of the vehicle wheels 11, 13, 15, 17 for the attachment of optical targets or wheel alignment angle transducer assemblies 11a, 13a, 15a, 17a. Each wheel adapter 10a includes a mounting shaft receiver configured to receive a stub mounting shaft extending from the optical target or transducer assembly to be mounted thereon. Once the wheel adapters 10a are in place, and the optical targets or transducer assemblies are mounted, various vehicle wheel alignment angles are measured and adjusted as required. Once the measurement and adjustment process is completed, such as by any conventional means, the vehicle rear wheel thrust line TL is known and identified.

To align the free-standing vehicle service apparatus or alignment fixture 50 relative to the identified thrust line TL of the vehicle 90 using the components of the present system, one of the front optical targets or transducer assemblies 11a or 17a is dismounted from the associated front wheel adapter 10a. As shown in FIGS. 9-11, the front left wheel 11 of the vehicle is utilized for this purpose, but those of ordinary skill in the art will recognize that the present procedure may be equally carried out from the opposite side of the vehicle without departing from the scope of the disclosure. With the optical target or transducer assembly 11a dismounted, a double-sided laser assembly 100 is mounted to the wheel adapter 10a by fitting the mounting shaft 102 of the double-sided laser assembly into the mounting shaft receiver of the wheel adapter 10a from which the front optical target or transducer assembly 11a was removed. Optionally, the single-sided laser assembly described above may be utilized in place of the double-sided laser assembly.

Next, the laser assembly is activated to project a laser beam 108r towards the rear of the vehicle 90, generally parallel to the supporting surface G on which the vehicle is disposed. The laser assembly is then rotationally adjusted about the axis X of the mounting shaft 104 to align the rearward projected laser beam 108r with an axial centerline of a mounting shaft of the rear optical target or alignment transducer 13a on the same side of the vehicle. Assuming that the vehicle front and rear wheels have the same radial dimensions, and that the front and rear wheel adapters 10a are mounted to the wheels with the mounting shaft receivers aligned to the respective axis of rotation for each vehicle wheel 11, 13, the rearward projected laser 108r should be aligned substantially parallel to the surface G supporting the vehicle when adjusted to intersect the centerline of the mounting shaft on the rear optical target or alignment transducer 13a.

Alternatively, if the mounting shaft of the rear optical target or alignment transducer 13a is not visible, or the vehicle is configured with differently sized front and rear wheels 11, 13, the free-standing laser alignment target 300 may be utilized to establish a level orientation of the laser assembly 100 relative to the vehicle supporting surface G. To utilize the free-standing laser alignment target 300, the laser alignment target 300 is initially placed immediately rearward from the front wheel 11 of the vehicle, with the target base panel 308 on the surface G on which the vehicle 90 is resting. The target panel 302 position is adjusted such that the rearward projecting laser beam 108r from the laser assembly 100 strikes the laser alignment target panel 302 in the region of the visible alignment marks 304. The incident location of the laser beam 108r on the laser alignment target panel 302 is noted. Alternatively, visible alignment marks 304 may be omitted from the laser alignment target panel 302 if an alternate means of identifying the incident point of laser illumination on the target panel 302 is provided, such as a removable magnetic marker or dry-erase pen marking.

Once the incident location of the laser beam 108r on the laser alignment target panel 302 is noted or marked for the initial position of the target 300, the laser alignment target is moved to a second location immediately forward from the rear wheel 13 of the vehicle 90, on the same side of the vehicle. The direction of the rearward projecting laser beam 108r is adjusted by either rotating the laser projector within the housing 102, or rotating the housing 102 about axis X until the laser beam 108r is incident on the laser alignment target panel 302 at the same location on the visible alignment marks 304 previously noted or applied with the laser alignment target 300 in the first position.

With the laser assembly adjusted, the laser alignment target 300 is returned to the first position to verify that the rearward laser projection 108r remains incident on the visible alignment marks 304 at the originally noted position. The process of positioning the laser alignment target 300 and adjusting the orientation of the laser assembly 100 to alter the incident point on the visible alignment marks 304 is repeated as necessary to ensure that the rearward projection 108r of the laser beam is substantially parallel to the surface G on which the vehicle 90 is resting.

With the laser assembly adjusted to project the rearward laser beam 108r substantially parallel to the vehicle support surface G, the optical target or alignment angle transducer 11a is re-mounted to the vehicle front wheel 11 by fitting the stub mounting shaft of the optical target or transducer assembly into the coaxial mounting shaft receiver 106 on the laser assembly 100. With guidance from the vehicle wheel alignment system 10, the front wheel 11 of the vehicle 90 is next steered by the operator into a position wherein the optical target or transducer assembly 11a mounting axis (as defined by the axis of the optical target or transducer mounting shaft) is aligned relative to the previously determined thrust line TL of the vehicle. Since the laser assembly 100 is mounted coaxially between the wheel adapter 10a and the optical target or transducer assembly 11a, the projection axis of the laser assembly rearward laser beam 108r is correspondingly aligned relative to the vehicle thrust line TL, and perpendicular to the mounting axis of the optical target or transducer assembly 11a.

Next, a laser beam 108f is projected between the laser assembly 100 and the free-standing vehicle service system alignment target 200, either by utilizing a forward-projecting laser beam from the laser assembly 100, or by projecting a laser from an aligned emitter secured on the free-standing vehicle service apparatus or alignment fixture 50 towards the wheel-mounted laser assembly 100.

When utilizing a double-sided laser assembly 100, the assembly projects a laser beam 108f in the forward direction which is coaxial with the projection of the rearward laser beam 108r, and which is correspondingly aligned substantially parallel to the surface G on which the vehicle is resting when the rearward laser beam is so aligned. With the forward projecting laser beam 108f activated, the free-standing vehicle service system alignment target 50 is moved into a general position in front of the vehicle 90, such that the mirror reflective target panel 200 on the target mounting bracket 202 interrupts the forward projecting laser beam 108f. Fine adjustments to the position and orientation of the vehicle service system alignment target 50 are made to achieve full retro-reflection of the forward projecting laser beam 108f back to the double-sided laser assembly 100. Aligning the vehicle service apparatus or alignment fixture in a horizontal plane by reflecting the laser beam 108f back to the source positions the mirror reflective target panel 200 normal to the vehicle thrust line TL, while rotating the vehicle service apparatus or alignment fixture about a horizontal axis transverse to the vehicle thrust line positions the reflective target panel 200 normal to the vehicle supporting surface G.

Once the forward projecting laser beam 108f is reflected back along the forward pathway to the laser assembly 100, the target panel 200 of the vehicle service apparatus or alignment fixture 50 is orientated perpendicular to the vehicle thrust line TL, which is parallel to the forward projecting laser 108f, as is any coplanar surface 52 of the apparatus or fixture 50. Those of ordinary skill in the art will recognize that the optimal position and orientation of the apparatus or fixture is defined by the vehicle manufacturer, and that the methods of the present disclosure may be readily utilized to position and orientate the apparatus or fixture to a wide range of positions and orientations relative to the vehicle by providing the projected reference line having a determined relationship to the vehicle. The vehicle service apparatus or alignment fixture 50 may then be utilized as necessary to complete any required adjustments to a vehicle system, such as a forward-looking radar emitter or receiver, collision avoidance system sensors, cameras, or headlight alignments using procedures set forth by the vehicle manufacturer.

Those of ordinary skill in the art will recognize that the same procedures may be utilized to align the vehicle service apparatus or alignment fixture 50 by projecting laser beam 108f from an associated emitter on the mounting bracket 202 towards a mirror reflective target mounted to the forward face of the laser assembly 100 at the front wheel 11, which is oriented perpendicular to the rearward laser projection axis 108r. Fine adjustments to the position and orientation of the vehicle service apparatus or alignment fixture 50 are made as previously described to achieve full retro-reflection of the rearward projecting laser beam from the mirror reflective target on the laser assembly 100 at the front wheel 11, back to the associated emitter on the mounting bracket 202. Aligning the vehicle service apparatus or alignment fixture in the horizontal plane positions the projected laser beam 108f parallel to the vehicle thrust line TL, while rotating the vehicle service apparatus or alignment fixture 50 about a horizontal axis positions the projected laser beam 108f parallel to the vehicle supporting surface G.

Those of ordinary skill in the art will further recognize that a fundamental concept of the present disclosure is to establish an observable reference line 108 relative to a specified characteristic of the vehicle, for example, one which is parallel to both the vehicle thrust line TL and the supporting surface G on which the vehicle rests, and to subsequently align the free-standing vehicle service apparatus or alignment fixture 50 relative to the established reference line as specified by the vehicle manufacturer. Accordingly, it will be understood that the laser emitters do not need to be secured to a vehicle wheel assembly 11, 13, 15, or 17 with a vehicle wheel adapter 10a if a suitable substitute free-standing support is provided, and which can be selectively adjusted to align the projected laser beams 108f, 108r and/or reflective targets relative to the vehicle as required, such as relative to both the determined thrust line TL of the vehicle 90 and to the surface G on which the vehicle is supported.

Those of ordinary skill in the art will further recognize that while the present disclosure is described with the use of laser lines to establish the reference line 108 in a manner which is visible to a human operator, it is not limited to the use of lasers, and any suitable optical guide means may be employed, including focused visible light, as well as light beams which are invisible to a human operator, such as infrared or ultraviolet light, provided that suitable detectors are utilized to facilitate the determination of proper positions and orientations of the various components as described herein.

Once the vehicle service apparatus or alignment fixture 50 is positioned and oriented relative to the vehicle, for example, the vehicle thrust line TL, the operator or service technician will proceed to carry out the vehicle manufacturer's recommended procedure for adjusting the associated vehicle components or sensors. These procedures may require the operator to interact with the vehicle electronic control module (ECM) either directly or through an OEM interface connected to a vehicle communication bus, to activate and carry out a OEM diagnostic or calibration procedure for the vehicle components or sensors, or to control the operation of the vehicle components or sensors directly during the calibration or adjustment procedure. In a further embodiment of the present disclosure, the processor or computer 31 associated with the vehicle wheel alignment system 10 may be configured with suitable software instructions to communicate with the vehicle ECM via suitable communication pathways, to provide the necessary instructions and/or commands to activate and carry out the OEM diagnostic or calibration procedure for the vehicle components or sensors, as well as to control the operation of the vehicle components or sensors directly during the calibration or adjustment procedure as needed. Suitable communication pathways for the wheel alignment system computer 31 to communicate with the vehicle ECM include both wired and wireless communication links, such as shown in U.S. Pat. No. 6,754,562 B2 to Strege et al., U.S. Pat. No. 6,917,417 B2 to Strege et al., and U.S. Pat. No. 7,359,775 B2 to Strege et al., each of which is herein incorporated by reference.

The present disclosure can be embodied in-part in the form of computer-implemented processes and apparatuses for practicing those processes. The present disclosure can also be embodied in-part in the form of computer program code containing instructions embodied in tangible media or other computer readable storage medium, wherein, when the computer program code is loaded into, and executed by, an electronic device such as a computer, micro-processor or logic circuit, the device becomes an apparatus for practicing the present disclosure.

The present disclosure can also be embodied in-part in the form of computer program code, for example, whether stored in a storage medium, loaded into and/or executed by a computer, or transmitted over some transmission medium, wherein, when the computer program code is loaded into and executed by a computer, the computer becomes an apparatus for practicing the present disclosure. When implemented in a general-purpose microprocessor, the computer program code segments configure the microprocessor to create specific logic circuits.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A method for disposing a vehicle service apparatus or alignment fixture relative to a line of a vehicle and to a vehicle supporting surface, comprising:
   determining a line of the vehicle associated with the relative positioning of the vehicle service apparatus or alignment fixture;
   disposing a laser assembly in proximity to one lateral side of said vehicle;
   aligning a projection axis of said laser assembly parallel to the surface supporting said vehicle and relative to said determined line of said vehicle;
   projecting, from said laser assembly, a laser beam reference line along said projection axis, such that said laser beam reference line is aligned relative to said determined line of said vehicle; and
   placing said vehicle service apparatus or alignment fixture in spaced-apart proximity to said vehicle at a predetermined orientation relative to a point of intersection with said laser beam reference line such that said vehicle service apparatus or alignment fixtures is disposed at a predetermined orientation relative to said determined line of said vehicle and to said vehicle supporting surface.

2. The method of claim 1 wherein said determined line of the vehicle is one of a thrust line and a centerline of the vehicle.

3. The method of claim 2 wherein said step of placing said vehicle service apparatus or alignment fixture includes altering said orientation of said vehicle service apparatus or alignment fixture to reflect said projected laser beam reference line along an incident axis from a reflective target on said vehicle service apparatus or alignment fixture when the reflective target is orientated perpendicular to said projected laser beam reference line.

4. The method of claim 1 further including the steps of establishing a communication link with an electronic control unit of said vehicle; and
   completing a service procedure on at least one vehicle external sensor observing said vehicle service apparatus or alignment fixture by communicating one or more instructions to said electronic control unit of said vehicle.

5. A method for disposing a vehicle service apparatus or alignment fixture relative to a line of a vehicle and to a vehicle supporting surface, comprising:
   determining at least one line of the vehicle associated with the relative positioning of the vehicle service apparatus or alignment fixture;
disposing a laser assembly in proximity to one lateral side of said vehicle;
   aligning a projection axis of said laser assembly parallel to the surface supporting said vehicle and relative to said at least one determined line of said vehicle;
   projecting, from said laser assembly, a laser beam reference line along said projection axis, such that said laser beam reference line is aligned relative to said at least one determined line of said vehicle;
   placing said vehicle service apparatus or alignment fixture in spaced-apart proximity to said vehicle at a predetermined orientation relative to a point of intersection with said laser beam reference line such that said vehicle service apparatus or alignment fixtures is at a predetermined orientation relative to said at least one determined line of said vehicle; and
   wherein said step of determining said at least one line of the vehicle includes:
   mounting a wheel adapter to each wheel of the vehicle;
   coupling an alignment measurement device to each of the wheel adapters, said alignment measurement device consisting of either an optical target or an alignment angle transducer;

acquiring data from said alignment measurement devices for processing by a vehicle wheel alignment system to determine one or more vehicle wheel alignment angles; and processing said determined vehicle wheel alignment angles to determine said at least one line of the vehicle.

6. The method of claim 5 further including the steps of establishing a communication link with an electronic control unit of said vehicle from said vehicle wheel alignment system; and completing a service procedure on at least one onboard vehicle sensor configured to observe said vehicle service apparatus or alignment fixture by communicating one or more instructions to said electronic control unit of said vehicle from said vehicle wheel alignment system.

7. A method for disposing a vehicle service apparatus or alignment fixture relative to a line of a vehicle and to a vehicle supporting surface, comprising:

determining at least one line of the vehicle associated with the relative positioning of the vehicle service apparatus or alignment fixture;

disposing a laser assembly in proximity to one lateral side of said vehicle;

aligning a projection axis of said laser assembly parallel to the surface supporting said vehicle and relative to said at least one determined line of said vehicle;

projecting, from said laser assembly, a laser beam reference line along said projection axis, such that said laser beam reference line is aligned relative to said at least one determined line of said vehicle;

placing said vehicle service apparatus or alignment fixture in spaced-apart proximity to said vehicle at a predetermined orientation relative to a point of intersection with said laser beam reference line such that said vehicle service apparatus or alignment fixtures is at a predetermined orientation relative to said at least one determined line of said vehicle; and wherein said step of projecting said laser beam reference line includes:

mounting a wheel adapter to each wheel on at least one side of said vehicle;

mounting an alignment measurement device to said wheel adapter on a rear wheel of the vehicle via a mounting shaft;

mounting said laser assembly to said wheel adapter mounted to a front wheel of the vehicle on the same side of the vehicle as said alignment measurement device;

projecting a laser beam rearward along said side of said vehicle from said laser assembly;

aligning said rearward projected laser beam with a centerline of said mounting shaft of said alignment device mounted on said wheel adapter at said rear wheel of the vehicle;

steering said front wheel of the vehicle to bring the projected laser beam into alignment with said at least one line of the vehicle;

projecting a laser beam forward along said side of said vehicle from said laser assembly, said forward projected laser beam coaxially aligned with a projection axis of said rearward projected laser beam; and whereby said projection axis of said forward and rearward projected laser beams define said laser beam reference line.

8. The method of claim 7 wherein said step of steering said front wheel further includes the steps of:

mounting an alignment device to said laser assembly; and
guiding steering movement of said front wheel with a vehicle wheel alignment system responsive to data received from said alignment device.

9. A method for disposing a vehicle service apparatus or alignment fixture relative to a line of a vehicle and to a vehicle supporting surface, comprising:

determining at least one line of the vehicle associated with the relative positioning of the vehicle service apparatus or alignment fixture;

disposing a laser assembly in proximity to one lateral side of said vehicle;

aligning a projection axis of said laser assembly parallel to the surface supporting said vehicle and relative to said at least one determined line of said vehicle;

projecting, from said laser assembly, a laser beam reference line along said projection axis, such that said laser beam reference line is aligned relative to said at least one determined line of said vehicle;

placing said vehicle service apparatus or alignment fixture in spaced-apart proximity to said vehicle at a predetermined orientation relative to a point of intersection with said laser beam reference line such that said vehicle service apparatus or alignment fixtures is at a predetermined orientation relative to said at least one determined line of said vehicle; and wherein said step of projecting said laser beam reference line includes:

mounting a wheel adapter to at least a front wheel of said vehicle;

mounting said laser assembly to said wheel adapter;

projecting a laser beam rearward along said vehicle from said laser assembly;

positioning a laser alignment target on said supporting surface in a first position rearward from said front wheel, said laser alignment target having a target panel with visible alignment marks;

observing a first intersection point of said rearward laser beam projection on said target panel;

repositioning said laser alignment target on said supporting surface to a second position further rearward from said front wheel, in proximity to a rear wheel of said vehicle;

observing a second intersection point of said rearward laser beam projection on said target panel;

adjusting a mounting orientation of said laser assembly on said wheel adapter to align said second intersection point with said first intersection point on said target panel;

steering said front wheel of the vehicle into alignment with said at least one line of the vehicle;

projecting a laser beam forward along said vehicle from said laser assembly, said forward projected laser beam coaxially aligned with a projection axis of said rearward projected laser beam; and whereby said projection axis of said forward and rearward projected laser beams define said laser beam reference line.

10. The method of claim 9 wherein said step of steering said front wheel further includes the steps of:

mounting an alignment device to said laser assembly; and
guiding steering movement of said front wheel with a vehicle wheel alignment system responsive to data received from said alignment device.

11. A method for disposing a vehicle service apparatus or alignment fixture relative to a line of a vehicle and to a vehicle supporting surface, comprising:

determining at least one line of the vehicle associated with the relative positioning of the vehicle service apparatus or alignment fixture;

disposing a laser assembly in proximity to one lateral side of said vehicle;

aligning a projection axis of said laser assembly parallel to the surface supporting said vehicle and relative to said at least one determined line of said vehicle;

projecting, from said laser assembly, a laser beam reference line along said projection axis, such that said laser beam reference line is aligned relative to said at least one determined line of said vehicle;

placing said vehicle service apparatus or alignment fixture in spaced-apart proximity to said vehicle at a predetermined orientation relative to a point of intersection with said laser beam reference line such that said vehicle service apparatus or alignment fixtures is at a predetermined orientation relative to said at least one determined line of said vehicle; and wherein said step of projecting said laser beam reference line includes:

mounting first wheel adapter to a front wheel of said vehicle;

mounting a second wheel adapter to a rear wheel of said vehicle on a same side of said vehicle as said first wheel adapter;

mounting an alignment measurement device to said second wheel adapter via a mounting shaft;

mounting said laser assembly to said first wheel adapter;

projecting a laser beam rearward along said vehicle from said laser assembly;

aligning said rearward projected laser beam with a centerline of said alignment measurement device mounting shaft for an alignment device mounted to said second wheel adapter;

steering said front wheel of the vehicle to bring the projected laser beam into alignment with said at least one line of the vehicle;

projecting from a laser source, a second laser beam rearward along said vehicle from said vehicle service apparatus or alignment fixture towards a reflective target on said laser assembly, said reflective target aligned normal to a projection axis of said first rearward projected laser beam;

altering said position and orientation of said vehicle service apparatus or alignment fixture to reflect said second rearward projected laser beam from said reflective target to said laser source such that a projection axis of said second rearward laser beam is coaxially aligned with said projection axis of said first rearward projected laser beam; and whereby a projection axis of said first rearward projected laser beam, and a projection axis of said second rearward projected laser beam, when in coaxial alignment, define said laser beam reference relative to which said vehicle service apparatus or alignment fixture is positioned and orientated.

12. The method of claim 11 wherein said step of steering said front wheel further includes the steps of:

mounting an alignment device to said laser assembly; and guiding steering movement of said front wheel with a vehicle wheel alignment system responsive to data received from said alignment device.

13. A laser assembly for use in establishing a reference line relative to a line of the vehicle, comprising:

a housing;

a stub mounting shaft projecting from an inward face of the housing along a mounting axis;

a mounting shaft receiver disposed in an outward face of the housing;

a laser projection means disposed within said housing, said laser projection means configured to project at least one laser beam outward from a lateral side surface of said housing, perpendicular to said mounting axis; and a means to establish a reference line at an opposite lateral side of said housing from said outward projected laser beam, said reference line coaxial with a projection axis of said at least one laser beam.

14. The laser assembly of claim 13 wherein said means to establish said reference line includes a second laser projection means disposed within said housing, said second laser projection means configured to project a second laser beam outward from said opposite lateral side surface of said housing and coaxial with said first laser beam;

wherein said first laser projection means consists of a first laser source; and wherein said second laser projection means consists of a second laser source.

15. The laser assembly of claim 13 wherein said means to establish said reference line includes a mirror reflective target disposed on said opposite lateral side of said housing, said mirror reflective target aligned with, and oriented normal to, said projection axis of said at least one laser beam, whereby incident illumination which is retro-reflected from said mirror reflective target is parallel to said projection axis of said at least one laser beam to establish said reference line.

16. An aligner for positioning and orientating a vehicle service apparatus or target fixture in alignment with a line of the vehicle and a vehicle supporting surface, comprising:

a projector housing an illumination source to project a reference line relative to the vehicle line, said projector further configured for mounting on an axis of a vehicle wheel adapter secured to a vehicle wheel assembly, and for coaxially supporting a wheel alignment sensor; and a target panel coupled to the vehicle service apparatus or target fixture in a fixed relationship by a target mounting bracket, said target panel configured for guiding alignment of said vehicle service apparatus or target fixture relative to said projected reference line.

17. An aligner for positioning and orientating a vehicle service apparatus or target fixture in alignment with a line of a vehicle and a vehicle supporting surface, comprising:

an assembly for use in projecting a reference line relative to said line of the vehicle and said vehicle supporting surface, said assembly configured for mounting to a vehicle wheel adapter on a mounting axis, and for coaxially receiving a wheel alignment sensor;

a laser projector disposed within said assembly, said laser projector configured to project a laser line in a first direction along a projection axis perpendicular to said mounting axis for alignment relative to said line of the vehicle and said vehicle supporting surface by alignment of said associated vehicle wheel adapter and wheel alignment sensor;

a mirror reflective target disposed on a surface of said assembly, said mirror reflective target aligned in a second direction which is opposite said first direction, and normal to, said projection axis of said laser line; and wherein illuminating light retro-reflected from said mirror reflective target in said second direction is in parallel alignment with said projection axis of said laser line.

18. The vehicle service system target aligner of claim 17 wherein said line of the vehicle is either a vehicle thrust line or a vehicle center line.

* * * * *